US007084739B2

United States Patent
Taki et al.

(10) Patent No.: US 7,084,739 B2
(45) Date of Patent: Aug. 1, 2006

(54) COMMUNICATION SYSTEM, AND INTERROGATOR AND TRANSPONDER FOR THE SYSTEM

(75) Inventors: Kazunari Taki, Nagoya (JP); Tsuyoshi Ohashi, Hashima (JP); Takuya Nagai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 445 days.

(21) Appl. No.: 10/607,168

(22) Filed: Jun. 27, 2003

(65) Prior Publication Data
US 2004/0090309 A1 May 13, 2004

(30) Foreign Application Priority Data
Jun. 28, 2002 (JP) ............................. 2002-190646

(51) Int. Cl.
*H04Q 5/22* (2006.01)
(52) U.S. Cl. ................. 340/10.1; 340/10.2; 340/572.4; 342/42
(58) Field of Classification Search ............... 340/10.1, 340/10.2, 10.3, 10.4, 572.1, 572; 342/42, 342/44, 50, 51
See application file for complete search history.

(56) References Cited

U.S. PATENT DOCUMENTS

| | | | | |
|---|---|---|---|---|
| 5,455,575 A | * | 10/1995 | Schuermann | 342/42 |
| 5,477,215 A | * | 12/1995 | Mandelbaum | 340/5.61 |
| 5,640,151 A | * | 6/1997 | Reis et al. | 340/10.2 |
| 5,686,902 A | * | 11/1997 | Reis et al. | 340/10.2 |
| 5,887,176 A | * | 3/1999 | Griffith et al. | 713/320 |
| 5,929,778 A | * | 7/1999 | Asama et al. | 340/10.51 |
| 6,034,603 A | * | 3/2000 | Steeves | 340/10.2 |
| 6,177,861 B1 | | 1/2001 | MacLellan et al. | |
| 6,566,997 B1 | * | 5/2003 | Bradin | 340/10.2 |
| 6,608,551 B1 | * | 8/2003 | Anderson et al. | 340/10.51 |
| 6,867,686 B1 | * | 3/2005 | Emmerling et al. | 340/10.2 |
| 2002/0175805 A9 | * | 11/2002 | Armstrong et al. | 340/10.31 |

FOREIGN PATENT DOCUMENTS

| | | |
|---|---|---|
| JP | A 8-327730 | 12/1996 |
| JP | A 9-326726 | 12/1997 |
| JP | A 2000-49656 | 2/2000 |
| JP | A 2000-268140 | 9/2000 |

* cited by examiner

*Primary Examiner*—Edwin C. Holloway, III
(74) *Attorney, Agent, or Firm*—Oliff & Berridge, PLC

(57) ABSTRACT

An interrogator including a transmitter which transmits a first carrier wave so that a first transponder modulates the first carrier wave based on first information and returns the modulated first carrier wave as a first reflected wave, a receiver which receives the first reflected wave, a demodulator which demodulates the first reflected wave into a demodulated signal, an information obtaining device which obtains the first information from the demodulated signal, a first judging device which judges, before the transmitter transmits the first carrier wave, whether a second interrogator is transmitting a second carrier wave so that a second transponder modulates the second carrier wave based on second information and returns the modulated second carrier wave as a second reflected wave, a second judging device which judges, when the first judging device judges that the second interrogator is transmitting the second carrier wave, whether the receiver can receive, as a third reflected wave, a modulated second carrier wave that has been modulated by the first transponder based on the first information and returned therefrom, and a controller which controls, when the second judging device judges that the receiver can receive the third reflected wave returned from the first transponder, the transmitter not to transmit the first carrier wave, and additionally controls the receiver to receive the third reflected wave.

16 Claims, 9 Drawing Sheets

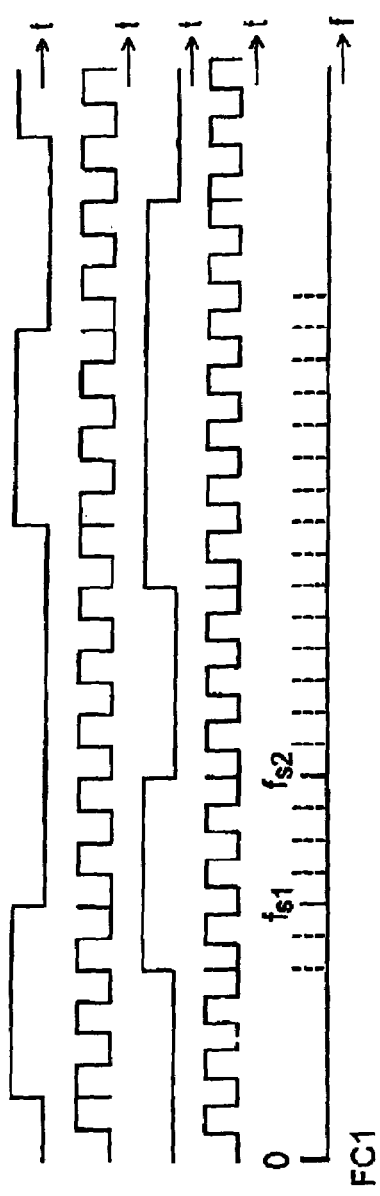
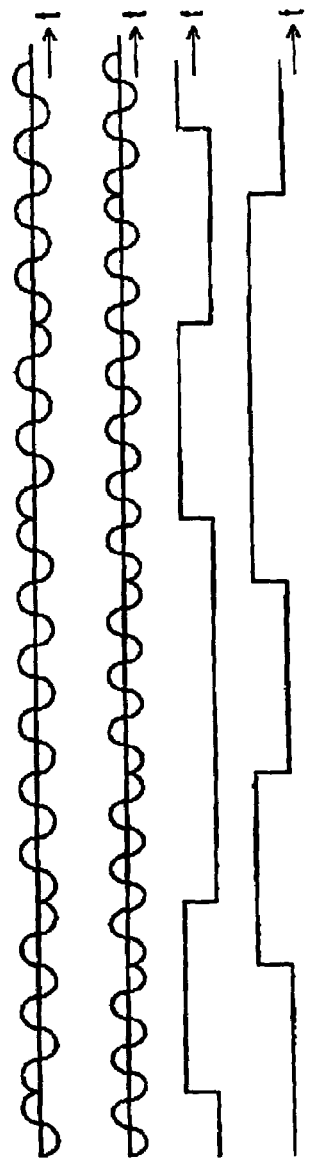
FIG. 6A
FIG. 6B
FIG. 6C
FIG. 6D
FIG. 6E
FIG. 6F
FIG. 6G
FIG. 6H
FIG. 6I
FIG. 6J
FIG. 6K

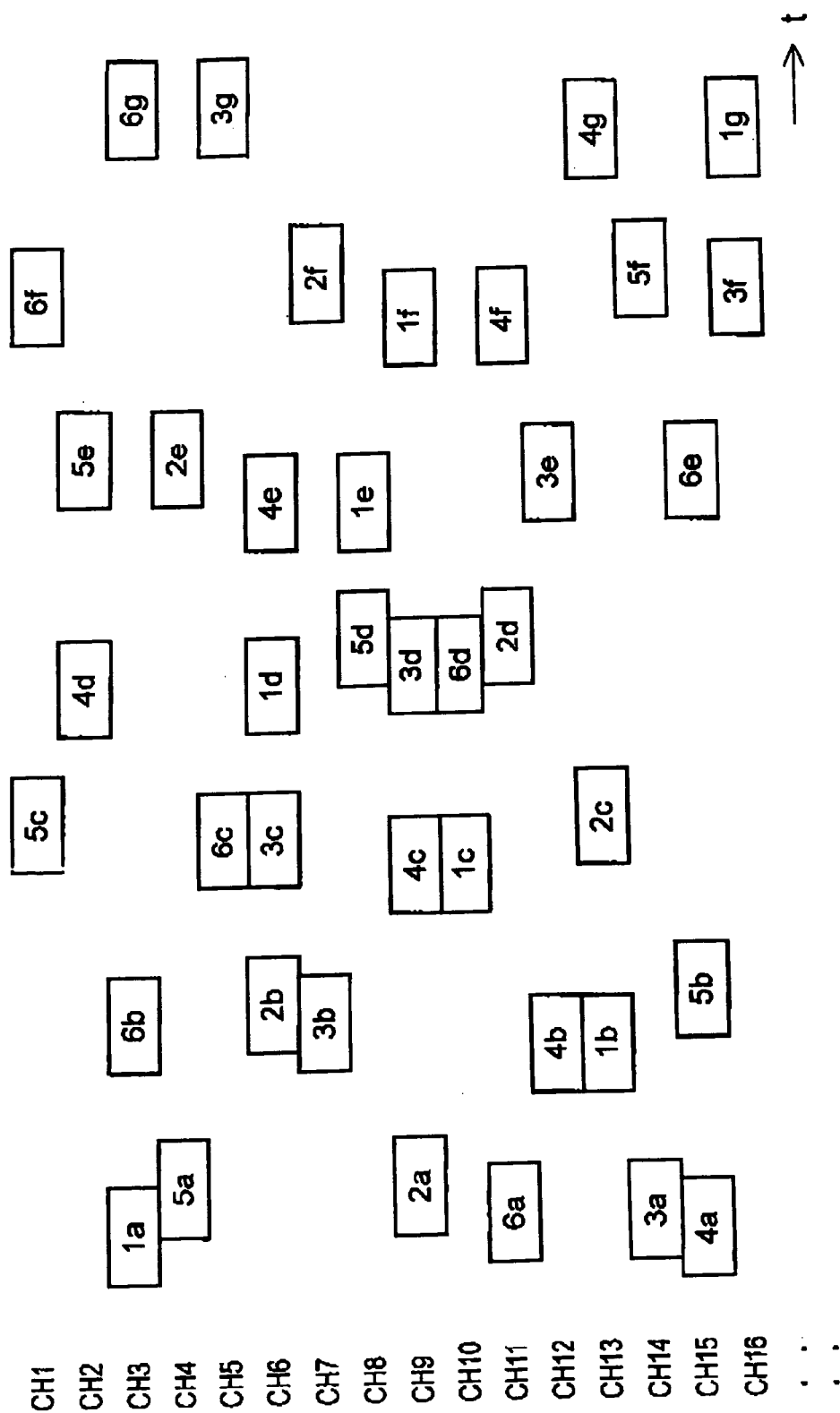

COMMUNICATION SYSTEM, AND INTERROGATOR AND TRANSPONDER FOR THE SYSTEM

BACKGROUND OF THE INVENTION

1. Field of the Invention

The present invention relates to a communication system including an interrogator that transmits a carrier wave and a transponder that receives the carrier wave, modulates the carrier wave, and returns the modulated carrier wave as a reflected wave to the interrogator, and also relates to each of the interrogator and the transponder for use in the communication system.

2. Discussion of Related Art

Japanese Patent Publication No. 2000-49656 or its corresponding U.S. Pat. No. 6,177,861 discloses a wireless communication system including a plurality of transponders and an interrogator that sends a carrier wave toward the transponders so that each of the transponders modulates the carrier wave using an information signal such as an ID signal identifying the each transponder or using a subcarrier wave that has been modulated using the information signal, and returns the modulated carrier wave as a reflected wave to the interrogator. If the communication system employs a plurality of interrogators, the interrogators are adapted to transmit respective carrier waves having different frequencies so as to prevent the carrier waves from interfering with each other.

However, there has been a problem that within a signal-reception frequency band of each interrogator, a strong wave transmitted from another interrogator may be mixed with signals transmitted from transponders and mask the same, thereby increasing errors. In particular, in the case where subcarrier waves are used, a wide signal-reception frequency band is advantageous because it can simultaneously deal with the signals sent from the many transponders. In the latter case, however, the wide signal-reception band is more easily interfered with by the other interrogators. In a particular case where a number of interrogators are set on a number of desks in an office, respectively, such that the interrogators are near to each other, noise waves having various frequencies are generated because of mixing and/or intermodulation of the carrier waves, even if the frequencies of the carrier waves differ from each other. Thus, the carrier waves interfere with each other, and the interrogators as a whole consume the increased amount of electric power. In addition, since each transponder does not have the function of selecting frequencies, the transponder modulates and reflects all the carrier waves sent from the interrogators having the different frequencies. Thus, though the interrogators transmit the carrier waves having the different frequencies, each of the interrogators may receive the modulated waves reflected by all the transponders (including other transponders than a target transponder) that are near to the each interrogator.

SUMMARY OF THE INVENTION

It is therefore an object of the present invention to provide a communication system, and an interrogator and a transponder for use in the communication system, that solve at least one of the above-indicated problems, e.g., can prevent interferences of a plurality of interrogators that are provided at respective positions near to each other, can identify each one of a plurality of transponders from the other transponder or transponders, or can save electric power. This object may be achieved according to any one of the following modes of the present invention in the form of an interrogator, a transponder, and a communication system, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without employing at least one of the features described with respect to each of the modes.

(1) An interrogator for use in a communication system including, in addition to the interrogator as a first interrogator, a second interrogator, a first transponder, and a second transponder, the first interrogator comprising a carrier wave transmitter which transmits a first carrier wave toward the first transponder, so that the first transponder receives the first carrier wave, modulates the first carrier wave based on first information, and returns the modulated first carrier wave as a first reflected wave, toward the first interrogator; a reflected wave receiver which receives the first reflected wave returned from the first transponder; a demodulator which demodulates the first reflected wave received by the reflected wave receiver, into a demodulated signal; an information obtaining device which obtains the first information from the demodulated signal; a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave toward the second interrogator; a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on the first information and returned therefrom; and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave.

Therefore, in the case where a plurality of interrogators including the present interrogator, i.e., the first interrogator are provided at respective positions that are considerably near to each other, the first interrogator judges, before transmitting the first carrier wave, whether the other or another interrogator, i.e., the second interrogator is transmitting the second carrier wave, and whether the reflected wave receiver is receiving the third reflected wave returned from the first transponder. If the second interrogator is transmitting the second carrier wave and the reflected wave receiver of the first interrogator can receive the signal, i.e., the third reflected wave, returned from the target transponder, i.e., the first transponder that has modulated the second carrier wave and is returning the thus modulated second carrier wave as the third reflected wave, then the first interrogator just continues receiving the third reflected wave, without transmitting the first carrier wave. Thus, the first interrogator does not transmit the first carrier wave in a disorderly manner, thereby preventing possible interferences of the first carrier wave with another or other carrier waves transmitted by another or other interrogators, i.e., the second carrier wave transmitted by the second interrogator. In addition, since the first interrogator does not transmit the first carrier wave, which would otherwise consume a great amount of electric power, it can save the electric power.

(2) The interrogator according to the feature (1), wherein when the second carrier wave transmission judging device judges that the second interrogator is transmitting the second carrier wave, and when the reflected wave reception judging device judges that the reflected wave receiver cannot receive the third reflected wave returned from the first transponder, the transmitter and receiver controller controls the carrier wave transmitter to transmit, toward the first transponder, a third carrier wave having a frequency different from a frequency of the second carrier wave.

Therefore, the first interrogator can obtain a desired response carried by the third carrier wave returned from the first transponder, while preventing the interference of the third carrier wave with the second carrier wave.

(3) The interrogator according to the feature (1), wherein the first and second interrogators transmit, as a common carrier wave, the first and second carrier waves that have a same frequency, the first interrogator transmits, as a first exclusive carrier wave, a third carrier wave having a frequency different from the frequency of the common carrier wave, and the second interrogator transmits, as a second exclusive carrier wave, a fourth carrier wave that has a frequency different from the respective frequencies of the common carrier wave and the first exclusive carrier wave, and wherein the second carrier wave transmission judging device judges whether the second interrogator is transmitting the second carrier wave as the common carrier wave, and does not judge whether the second interrogator is transmitting the fourth carrier wave as the second exclusive carrier wave.

Therefore, the first interrogator can easily judge whether another interrogator is transmitting a carrier wave, i.e., whether the second interrogator is transmitting the second carrier wave.

(4) The interrogator according to the feature (3), wherein a power of each of the first and second carrier waves as the common carrier wave is smaller than a power of each of the third and fourth carrier waves as the first and second exclusive carrier waves.

Therefore, the probability that the commands carried by the first exclusive carrier wave transmitted from the first interrogator when it interrogates the first transponder, is interfered with by the common carrier wave, is low, and accordingly the first transponder can stably receive those commands.

(5) The interrogator according to the feature (3) or (4), father comprising an identification information transmitter which periodically transmits, when the carrier wave transmitter transmits the first carrier wave as the common carrier wave, at least one of (a) first identification information that identifies, in distinction from the second interrogator, the first interrogator that is transmitting the common carrier wave and (b) second identification information that identifies the common carrier wave in distinction from each of the first and second exclusive carrier waves, such that the at least one of (a) the first identification information and (b) the second identification information accompanies the common carrier wave.

Therefore, the first transponder can identify the first interrogator in distinction from the second interrogator. In addition, when the first transponder operates to send certain information to a target interrogator, i.e., the first interrogator, if the first interrogator is transmitting the common carrier wave toward the first transponder, then the first transponder can return the common carrier wave carrying that information to the first interrogator; and if not, then the first transponder can send a calling signal that calls the first interrogator, to the first interrogator.

(6) The interrogator according to any of the features (1) through (5), wherein the transmitter and receiver controller comprises a first-carrier-wave-transmission stopping portion which periodically stops the carrier wave transmitter from transmitting the first carrier wave.

While the first-carrier-wave-transmission stopping portion stops the carrier wave transmitter from transmitting the first carrier wave, another interrogator, i.e., the second interrogator can transmit the second carrier wave carrying certain commands.

(7) A transponder for use in a communication system including, in addition to the transponder as a first transponder, a second transponder, the first interrogator according to any of the features (3) through (6), and a second interrogator, the first transponder comprising a carrier wave receiving and returning device which receives each of the common carrier receiver and the first exclusive carrier wave transmitted from the first interrogator; a subcarrier wave modulator which generates a subcarrier wave and modulates the subcarrier wave based on an information signal representing identification information that identifies the first transponder in distinction from the second transponder; a carrier wave modulator which modulates the common carrier wave received by the carrier wave receiving and returning device, based on the subcarrier wave modulated by the subcarrier wave modulator, so that the carrier wave receiving and returning device returns the modulated carrier wave as the first reflected wave; a common carrier wave reception judging device which judges whether the carrier wave receiving and returning device is receiving the common carrier wave; and a modulation controller which controls, when the common carrier wave reception judging device judges that the carrier wave receiving and returning device is receiving the common carrier wave, the carrier wave modulator to modulate the received common carrier wave, so that the carrier wave receiving and returning device returns the modulated carrier wave as the first reflected wave.

Therefore, the present transponder, i.e., the first transponder can efficiently modulate the received common carrier wave and return the thus modulated carrier wave as the first reflected wave, and accordingly it can reduce the consumption of electric power.

(8) The transponder according to the feature (7), further comprising an exclusive carrier wave reception judging device which judges whether the carrier wave receiving and returning device is receiving the first exclusive carrier wave transmitted from the first interrogator to the first transponder, the first exclusive carrier wave representing an interrogation directed from the first interrogator to the first transponder, wherein the modulation controller comprises a modulation stopping portion which stops, when the exclusive carrier wave reception judging device judges that the carrier wave receiving and returning device is not receiving the first exclusive carrier wave, a modulating operation of the carrier wave modulator for a pre-set time.

Therefore, the first transponder can save the electric power.

(9) The transponder according to the feature (7) or (8), wherein the modulation controller comprises a communication requesting portion which, when the first transponder operates to communicate with the first interrogator using the first exclusive carrier wave and when the common carrier wave reception judging device judges that the carrier wave receiving and returning device is receiving the common carrier wave, adds, to the information signal used by the subcarrier wave modulator to modulate the subcarrier wave, a communication requesting signal that requests the first interrogator to transmit the first exclusive carrier wave to the first transponder so that the first interrogator and the first transponder communicate with each other using the first exclusive carrier wave.

Therefore, the first transponder can efficiently utilize the received common carrier wave, and can make desired communications with the first interrogator even when it is receiving the common carrier wave. Thus, the first transponder can enjoy communications with a high degree of freedom.

(10) The transponder according to any of the features (7) through (9), wherein the subcarrier wave modulator comprises a frequency hopping portion which hops a frequency of the subcarrier wave.

Therefore, the first or third reflected wave returned from the first transponder can be prevented from being interfered with by the second reflected wave returned from the second transponder. In addition, the first transponder can make communications with a high degree of secrecy.

(11) A communication system including the first interrogator according to any of the features (8) through (6), a second interrogator, the first transponder according to any of the features (7) through (10), and a second transponder, wherein the first and second interrogators comprise a primary interrogator which primarily transmits the common carrier wave toward each of the first and second transponders, and a secondary interrogator which sends, to the primary interrogator, a common-carrier-wave-transmission requesting signal that requests the primary interrogator to transmit the common carrier wave so that the primary interrogator transmits the common carrier wave toward the each of the first and second transponders, and which subsequently is ready for receiving a corresponding one of the first and second reflected waves returned from the first and second transponders.

Therefore, in a waiting state, the secondary interrogator need not continuously make communications and, in an operating state only, it continuously make communications. Thus, the secondary interrogator can save the electric power. In addition, the transponders other than the interrogators need not continuously make communications, and accordingly can save the electric power.

(12) The communication system according to the feature (11), wherein the primary interrogator transmits, together with the common carrier wave, an information signal comprising at least one of (a) a first identification signal that identifies the common carrier wave in distinction from each of the first and second exclusive carrier waves and (b) a second identification signal that identifies, in distinction from the secondary interrogator, the primary interrogator that is transmitting the common carrier wave.

Therefore, each of the first and second transponders can easily identify, based on the information signal, the received common carrier wave from each of the first and second exclusive carrier waves, and/or can easily identify the primary interrogator transmitting the common carrier wave, in distinction from the secondary interrogator. Thus, each transponder can quickly respond to a calling of a corresponding one of the primary and secondary interrogators.

(13) The interrogator according to any of the features (1) through (6), wherein the carrier wave transmitter comprises a first antenna having a first range of directivity, and the reflected wave receiver comprises a second antenna having a second range of directivity, the first range of directivity being wider than the second range of directivity.

Therefore, the carrier wave transmitter can transmit the first carrier wave toward two or more transponders in a wide range or area, and the reflected wave receiver can reliably receive one or more reflected waves from one or more transponders in a specific, narrow range or area.

(14) A communication system comprising a first interrogator and a second interrogator; and a first transponder and a second transponder, wherein the first interrogator comprises a carrier wave transmitter which transmits a first carrier wave toward the first transponder so that the first transponder receives the first carrier wave, modulates the first carrier wave based on first information, and returns the modulated first carrier wave as a first reflected wave, to the first interrogator, a reflected wave receiver which receives the first reflected wave returned from the first transponder, a demodulator which demodulates the first reflected wave received by the reflected wave receiver, into a demodulated signal, an information obtaining device which obtains the first information from the demodulated signal, a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave, to the second interrogator, a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on the first information and returned therefrom, and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave, wherein the first and second interrogators can transmit, as a common carrier wave, the first and second carrier waves that have a same frequency, the first interrogator can transmit, as a first exclusive carrier wave, a third carrier wave having a frequency different from the frequency of the common carrier wave, and the second interrogator can transmit, as a second exclusive carrier wave, a fourth carrier wave that has a frequency different from the respective frequencies of the common carrier wave and the first exclusive carrier wave, wherein the second carrier wave transmission judging device judges whether the second interrogator is transmitting the second carrier wave as the common carrier wave, and does not judge whether the second interrogator is transmitting the fourth carrier wave as the second exclusive carrier wave, and wherein the first transponder comprises a carrier wave receiving and returning device which receives each of the common carrier receiver and the first exclusive carrier wave transmitted from the first interrogator, a subcarrier wave modulator which generates a subcarrier wave and modulates the subcarrier wave based on an information signal representing identification information that identifies the first transponder in distinction from the second transponder, a carrier wave modulator which modulates the common carrier wave received by the carrier wave receiving and returning device, based on the subcarrier wave modulated by the subcarrier wave modulator, so that the carrier wave receiving and returning device returns the modulated carrier wave as the first reflected wave, a common carrier wave reception judging device which judges whether the carrier wave receiving and returning device is receiving the common carrier wave, and a modulation controller which controls, when the common carrier wave reception judging device judges that the carrier wave receiving and returning device is receiving the common carrier wave, the carrier wave modulator to modulate the received common carrier wave, so that the carrier wave receiving and returning device returns the modulated carrier wave as the first reflected wave.

(15) A communication system comprising a first interrogator and a second interrogator; and a first transponder and a second transponder, wherein the first interrogator comprises a carrier wave transmitter which transmits a first carrier wave toward the fist transponder so that the first transponder receives the first carrier wave, modulates the first carrier wave based on first information, and returns the modulated first carrier wave as a first reflected wave, to the first interrogator, a reflected wave receiver which receives the first reflected wave returned from the first transponder, a demodulator which demodulates the first reflected wave received by the reflected wave receiver, into a demodulated signal an information obtaining device which obtains the first information from the demodulated signal, a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave, to the second interrogator, a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on the first information and returned therefrom, and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave.

(16) The communication system according to the feature (15), wherein the first and second interrogators can transmit, as a common carrier wave, the first and second carrier waves that have a same frequency, the first interrogator can transmit, as a first exclusive carrier wave, a third carrier wave having a frequency different from the frequency of the common carrier wave, and the second interrogator can transmit, as a second exclusive carrier wave, a fourth carrier wave that has a frequency different from the respective frequencies of the common carrier wave and the first exclusive carrier wave, and wherein the second carrier wave transmission judging device judges whether the second interrogator is transmitting the second carrier wave as the common carrier wave, and does not judge whether the second interrogator is transmitting the fourth carrier wave as the second exclusive carrier wave.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIGS. 6A, 6B, 6C, 6D, 6E, 6F, 6G, 6H, 6I, 6J, and 6K are views showing respective signals produced by the interrogators 10, 11, 12 and the transponders 20, 21, 22, 23, 24, 25;

FIG. 7 is an illustrative view showing respective outputs of a plurality of channels;

DETAILED DESCRIPTION OF THE PREFERRED EMBODIMENTS

Figure 1:
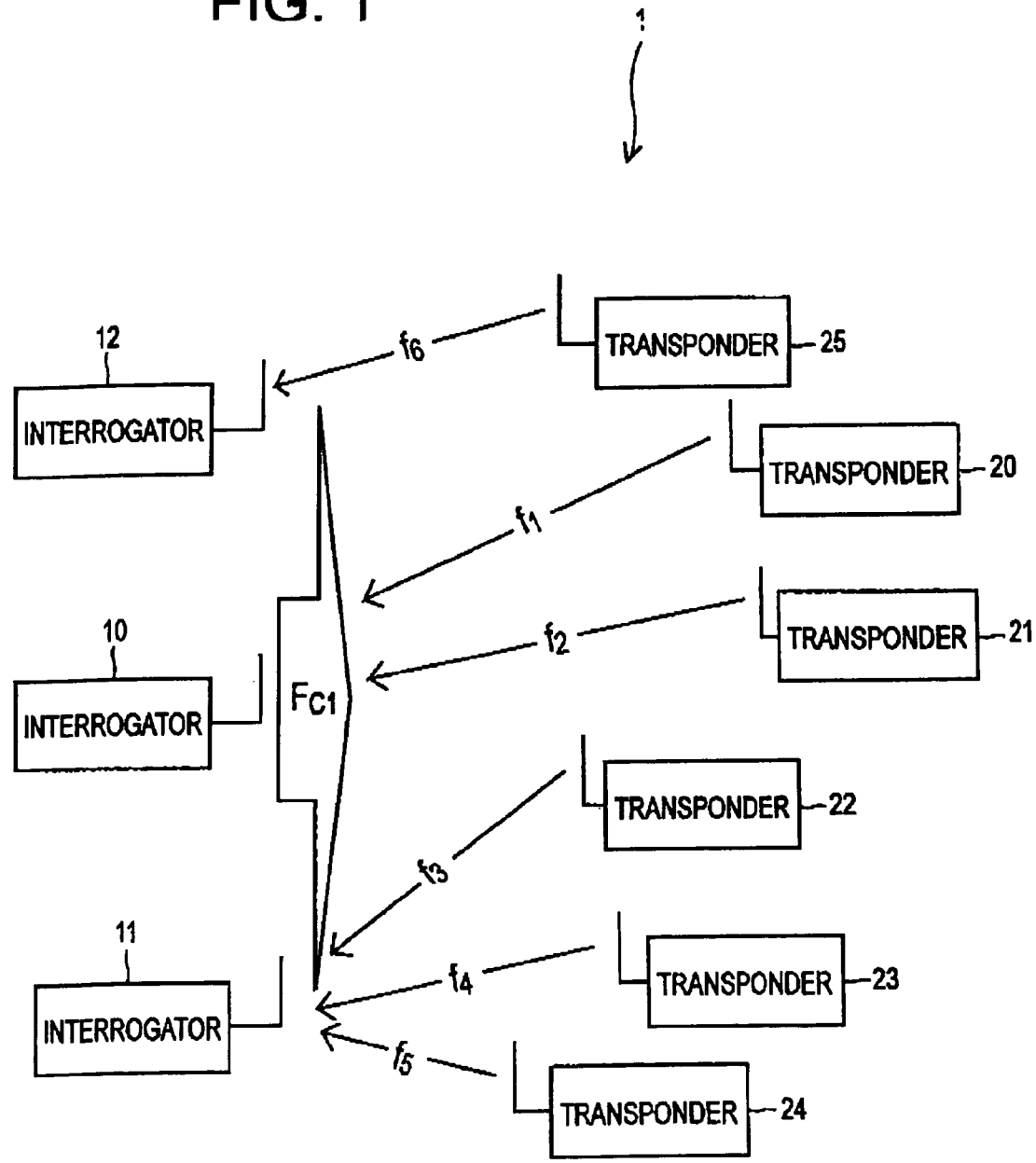
FIG. 1 is an illustrative view showing a construction of a communication system 1 to which the present invention is applied.
Figure 2:
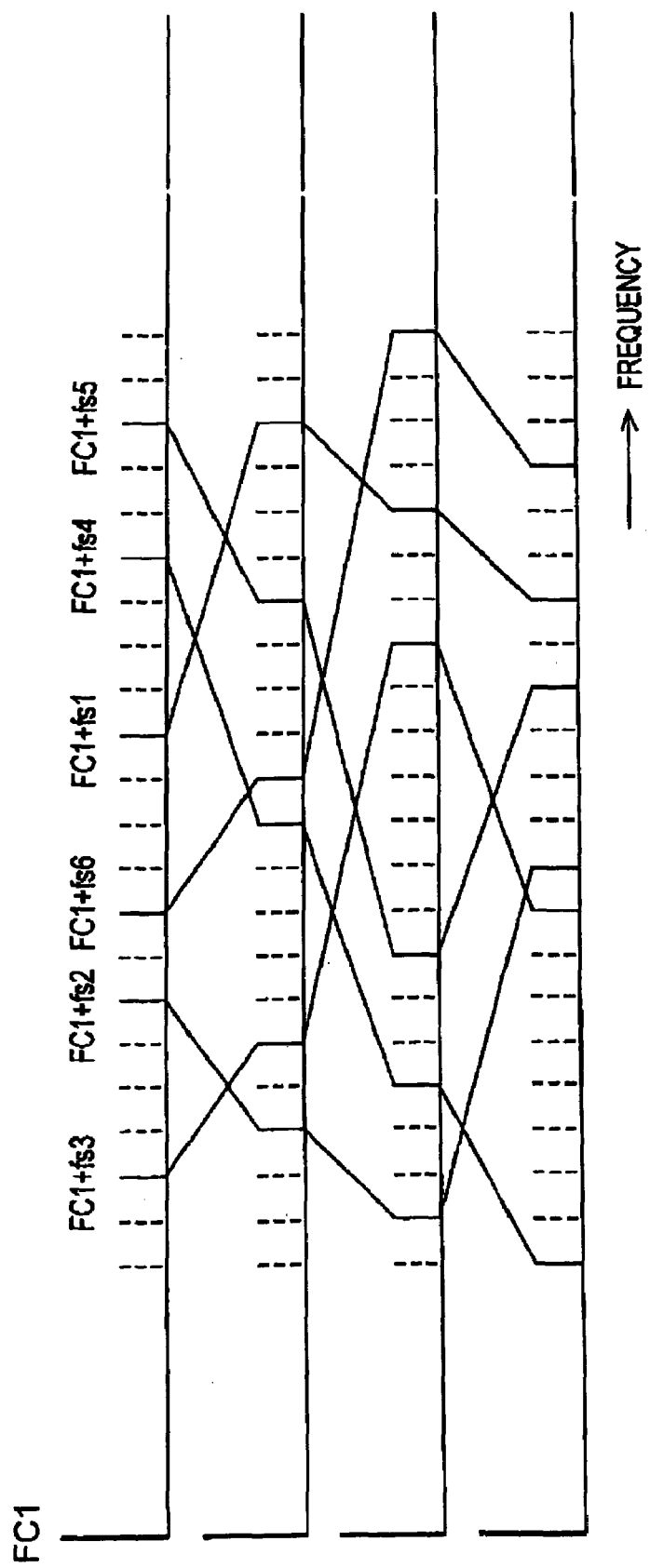
FIG. 2 is a view showing a relationship between a carrier wave and reflected waves that is used in the communication system 1.

Hereinafter, there will be described a communication system 1 embodying the present invention, by reference to the drawings. FIG. 1 shows a construction of the communication system 1; and FIG. 2 shows a relationship between a carrier wave and reflected waves that is employed in the system 1.

As shown in FIG. 1, the communication system 1 includes three interrogators 10, 11, 12, and five transponders 20, 21, 22, 23, 24, 25 provided in the vicinity of the interrogators 10–12. The interrogator 10 transmits a carrier wave, FC1, toward each of the transponders 20-25 provided in the vicinity of the interrogator 10. The transponder 20 returns a reflected wave, f1; and the other transponders 21, 22, 23, 24, 25 return respective reflected waves, f2, f3, f4, f5, f6.

The transponders 20–25 subject, using respective subcarrier signals, fs1, fs2, fs3, fs4, fs5, fs6, that have been subjected to respective primary modulations using respective information signals (i.e., data), the respective received carrier waves FC1 to respective secondary modulations, and return the thus modulated carrier waves as the respective reflected waves. More specifically described by reference to FIG. 2, respective frequencies of the respective subcarrier signals fs1–fs6 corresponding to the respective reflected waves f1–f6 differ from each other, and are hopping from each other. As shown in FIG. 2, sideband signals, FC1+fs1, FC1+fs2, FC1+fs3, FC1+fs4, FC1+fs5, FC1+fs6, fall in a signal-reception frequency band of the interrogator 10, but the probability that those sideband signals collide and interfere with each other is very small. Therefore, it is possible to selectively obtain the particular information signal transmitted by each one of the transponders 20–25. The interrogator 10 receives the respective transponder signals transmitted from the respective transponders 20, 21; the interrogator 11 receives the respective transponder signals from the respective transponders 22, 23, 24; and the interrogator 12 receives the transponder signal from the transponder 25. Thus, the carrier wave FC1 transmitted by the interrogator 10 is used as a common carrier wave, and accordingly the other interrogators 11, 12 need not transmit a carrier wave. Thus, the present communication system 1 can save an electric power that would otherwise be needed by the interrogators 11, 12 to transmit respective carrier waves.

Figure 3:
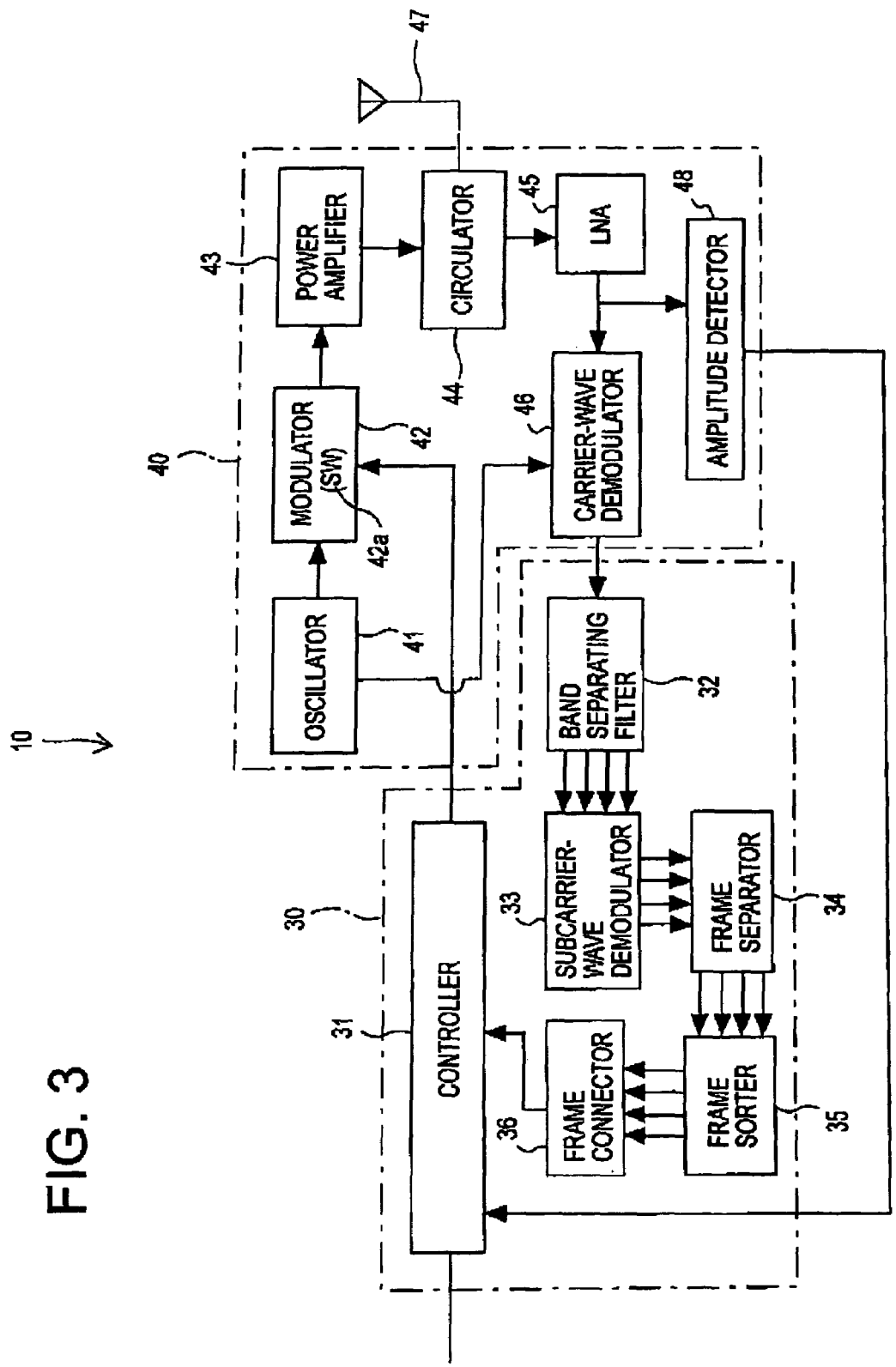
FIG. 3 is a diagrammatic view showing an electric arrangement of an interrogator 10 as part of the communication system 1.

Next, an electric arrangement of the interrogator 10 will be described by reference to FIG. 3. As shown in FIG. 3, the interrogator 10 includes a digital circuit portion 30 and an analog circuit portion 40. The analog circuit portion 40 includes an oscillator 41 that can oscillate various carrier waves having respective frequencies, for example, 900 MHz, 2.4 GHz, and 5 GHz; a modulator 42 that modulates, as needed, each carrier wave sent from the oscillator 41, using ASK (amplitude-shift keying) modulation, so that the modulated carrier wave represents, e.g., an identification code of the interrogator 10, a hopping timing, and/or a hopping pattern; a power amplifier 43 that amplifies the power of the carrier wave modulated by the modulator 42; a circulator 44 that separates input and output signals from each other, so that the output of the power amplifier 43 is transmitted to an antenna 47 and an electric wave received by the antenna 47 is sent to a low noise amplifier (hereinafter, referred to as the "LNA") 45; the LNA 45 that amplifies the received signal that has been received by the antenna 47 from each transponder; a carrier-wave demodulator 46 that mixes the received signal (i.e., modulated carrier wave) amplified by the LNA 45, with the signal (i.e., carrier wave) from the oscillator 41, i.e., subjects the received signal to homodyne detection; and an amplitude detector 48 that detects, from the received signal an amplitude or magnitude of a carrier wave transmitted by each of the other interrogators, and sends the detected magnitude to a controller 31. The modulator 42 is equipped with a switch 42a that is switched by the controller 31 to allow, or stop, the supplying of electric power to the modulator 42 in order to allow or stop transmitting carrier waves.

The digital circuit portion 30 includes a band separating filter 82 that converts the demodulated signal that has been subjected to the homodyne detection by the carrier wave demodulator 46, into a digital signal and additionally subjects the thus digitized demodulated signal to a filtering treatment so that the demodulated signal is separated into a plurality of channels corresponding to a plurality of hopping frequencies; a subcarrier-wave demodulator 33 that demodulates each of the subcarrier wave signals provided by the band separating filter 32 and reproduces its original information signal; a frame separator 34 that separates respective outputs of the channels produced by the subcarrier-wave demodulator 33, into respective appropriate frames; a frame sorter 35 that sorts the frames provided by the frame separator 34; a frame connector 36 that connects, for each of the transponders, the corresponding frames to each other in time sequence; and the controller 31 that controls the overall operation of the interrogator 10. The information (i.e., data) signal thus obtained for each transponder, i.e., the frames connected to each other in time sequence by the frame connector 36, is inputted to the controller 31. Each of the other interrogators 11, 12 has a construction identical with that of the interrogator 10.

Figure 4:
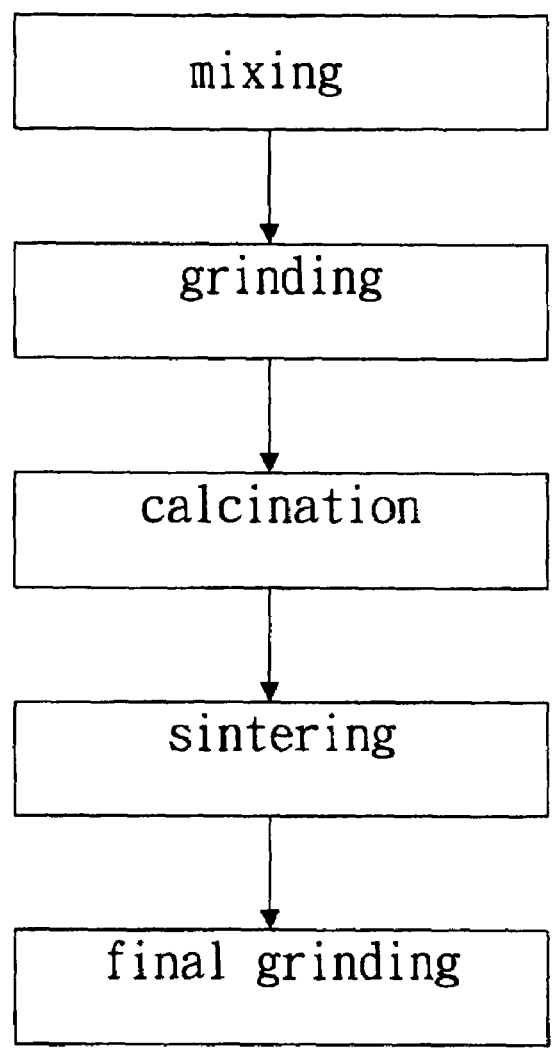
FIG. 4 is a diagrammatic view showing a transponder 20, 21, 22, 23, 24, 25 as part of the communication system 1.

Next, there will be described a construction of each of the transponders 20, 21, 22, 23, 24, 25, by reference to FIG. 4. As shown in FIG. 4, each transponder includes a modulator demodualtor 60 connected to an antenna 61, and a digital circuit portion 50. The digital circuit portion 50 includes a controller 51 that controls the overall operation of the transponder; a subcarrier-wave oscillator 53 that oscillates a subcarrier wave; and a subcarrier-wave modulator 52 that modulates the subcarrier wave sent from the subcarrier-wave oscillator 58, utilizing phase-shift keying (PSK), so that the modulated subcarrier wave represents an information signal inputted to the controller 51. The subcarrier wave modulated by the subcarrier-wave modulator 52 is inputted to the modulator demodulator 60, so as to modulate the carrier wave transmitted from the interrogator 10. The thus modulated carrier wave is returned as a reflected wave from the antenna 61. Moreover, each of the subcarrier-wave oscillator 53 and the subcarrier-wave modulator 52 may be replaced with a software that utilizes a clock of the controller 51. In addition, the subcarrier wave may be modulated using a different method, e.g., frequency-shift keying (FSK). Moreover, the subcarrier-wave oscillator 53 and the subcarrier-wave modulator 52 may be integrated with the controller 51 and may be provided in the form of one chip.

Figure 5:
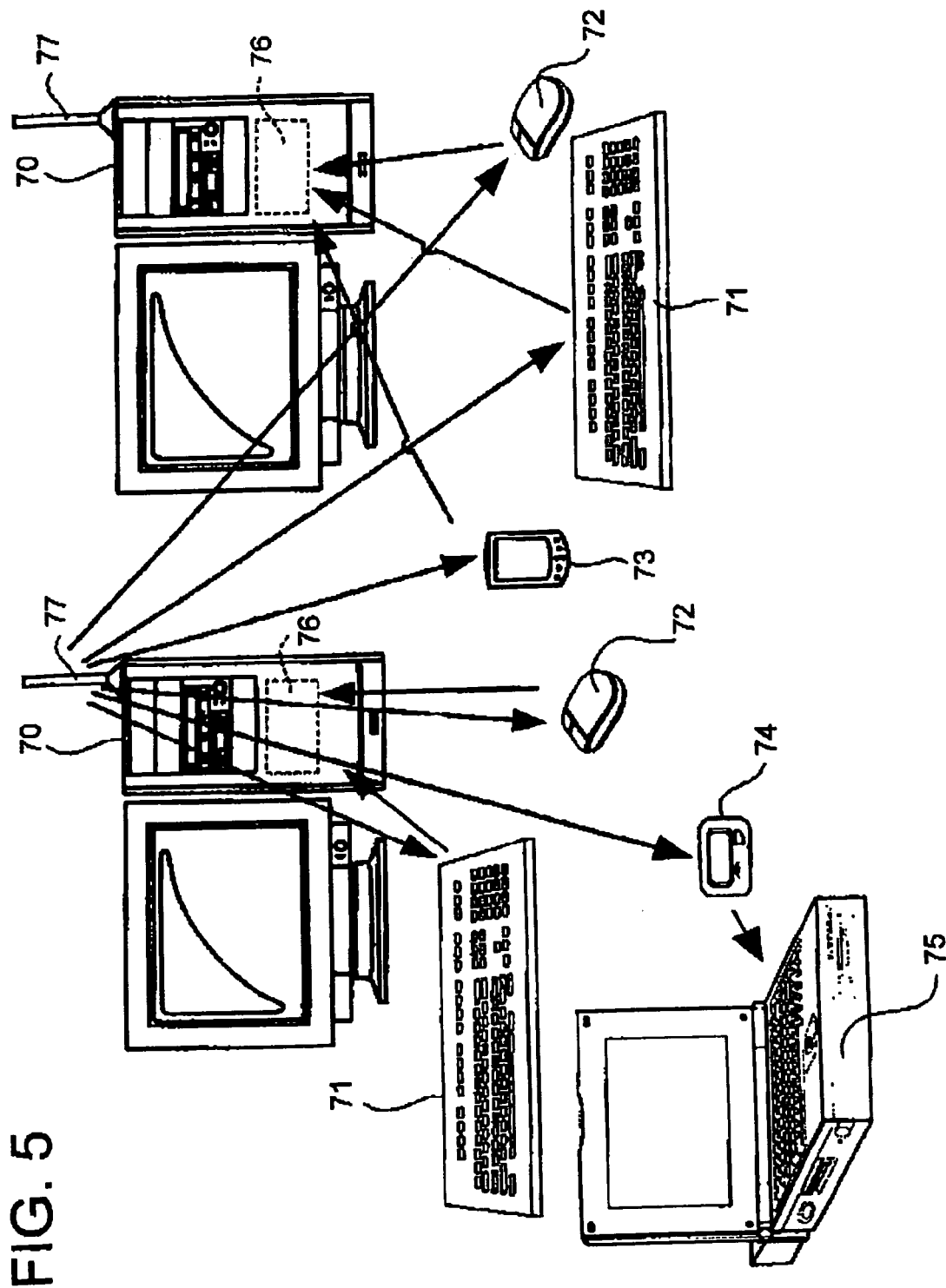
FIG. 5 is an illustrative view showing an arrangement in which a plurality of personal computers employ the communication system 1.

As shown in FIG. 5, the interrogators 10, 11, 12 may be incorporated by respective personal computers (hereinafter, referred to as the "PC") 70 (only two PCs 70 are shown in FIG. 5), and the transponders 20, 21, 22, 23, 24, 25 may be incorporated by keyboards 71, mice 72, a PDA (personal digital assistant) 73, and a person identifying device 74, respectively. In this case, each of the interrogators can receive signals inputted through each keyboard 71 or each mouse 72, or receive information from the PDA 73 or the person identifying device 74. Each PC 70 may have, on its upper surface, a wide-range-directivity transmission antenna 77 such as a quarter-wavelength whip antenna, and may have, inside its front surface, a narrow-range-directivity receiving antenna 76 such as a flat-array antenna. The wide-range-directivity transmission antenna 77 may be used to transmit a common carrier wave, i.e., an interrogator wave, toward a wide range; and the narrow-range-directivity receiving antenna 76 may be used to receive one or more reflected waves transmitted from a specific narrow range, so that the antenna 76 is not influenced by one or more transponders that is not or are not related to the corresponding PC 70.

The keyboards 71 and the mice 72 are used constantly or continuously, but communicate only a small amount of information with the corresponding PCs 70. Hence, the communications of each PC 70 with the corresponding devices 71, 72 are made using a common carrier wave. More specifically described, the keyboards 71 and the mice 72 effectively utilize the common carrier wave so as to continually send certain sorts of data (e.g., an ID (identification) code plus key codes, or an ID code plus movement-amount data). In this case, each of the interrogators additionally receives signals sent from the keyboards and mice of the other PCs than the corresponding PC. However, based on the ID codes, each interrogator can select the necessary data only. On the other hand, the PDA 73 communicates a considerably great amount of data, such as a document file or image data; and each interrogator needs to make communications with the person identifying device 74 in a state in which the transponder of the device 74 is identified. In those cases, an exclusive carrier wave is used to make communications with each device 73, 74. For example, the PDA 73 starts communications, as follows: First, the PDA 73 outputs, in a state in which the common carrier wave is being transmitted, a requesting signal that designates a target interrogator, that is, outputs a reflected wave as a response thereof; then the interrogator receives and detects the requesting signal, and transmits an exclusive carrier wave to make communications with the transponder of the PDA 78.

More specifically described, in many cases, the common carrier wave signal received by each transponder is modulated using a subcarrier wave that has been modulated using an information signal obtained by adding a requesting signal that designates a target interrogator and requests the interrogator to make communications using an exclusive carrier wave, to a certain sort of signal such as an ID signal of the each transponder, and the thus modulated common carrier wave is returned as a reflected wave from the each transponder. However, it is possible to directly transmit the above-described requesting signal together with the reflected common carrier wave that has been modulated, or to modulate the common carrier wave using a signal obtained by adding the requesting signal to the subcarrier wave that has been modulated, and return the thus modulated common carrier wave as a reflected wave. Thus, each interrogator need not continuously interrogate whether there are any transponders that need to make communications therewith, which contributes to saving the electric power.

Figure 8:
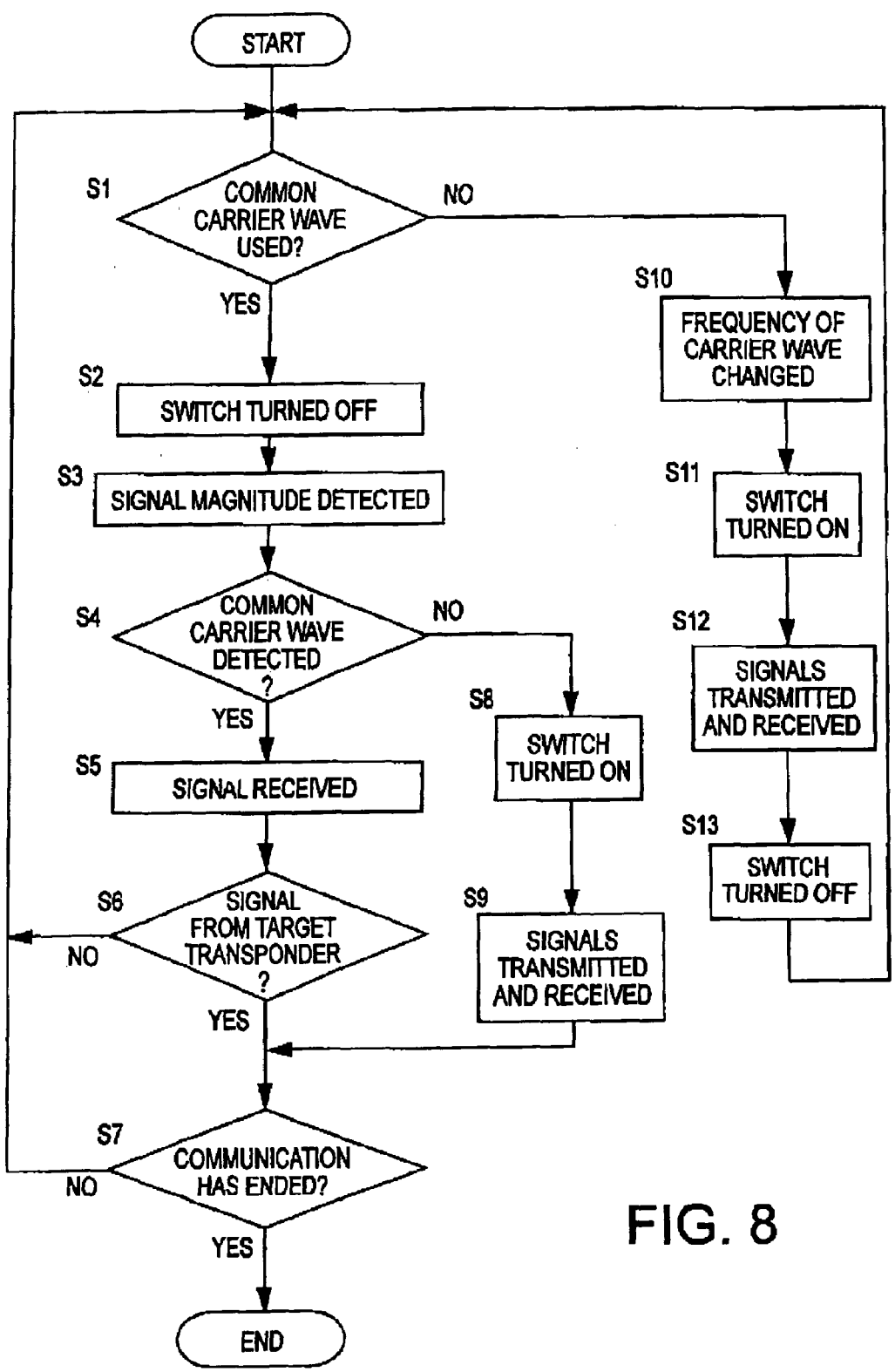
FIG. 8 is a flow chart representing an operation of each of the interrogators 10, 11, 12.
Figure 9:
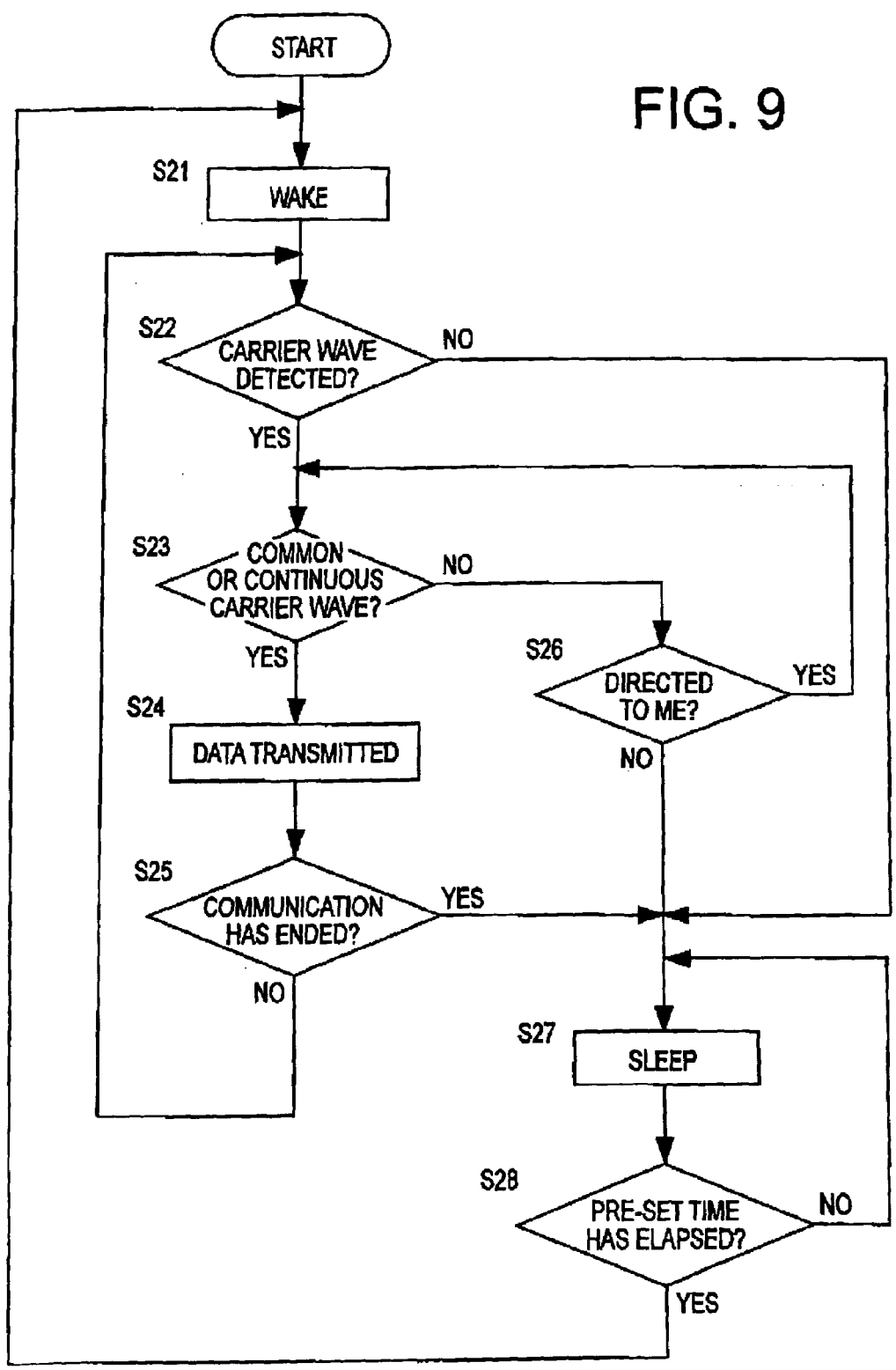
FIG. 9 is a flow chart representing an operation of each of the transponders 20, 21, 22, 23, 24, 25.

Next, the operation of the communication system 1 constructed as described above will be described by reference to FIGS. 1 through 9. FIGS. 6A through 6K show respective signals that are produced by respective portions of each interrogator 10–12 and each transponder 20–25; FIG. 7 is an illustrative view showing respective outputs of the channels; FIG. 8 is a flow chart representing the operation of each interrogator 10–12; and FIG. 9 is a flow chart representing the operation of each transponder 20–25.

Before the interrogator 10 transmits a carrier wave, the interrogator 10 judges, based on a magnitude of a signal that is received by the antenna 47 and is detected by the amplitude detector 48 via the circulator 44 and the LNA 45, whether there are any other interrogators that are transmitting a carrier wave. Depending on the judgment result, the interrogator 10 may perform special operations, described later. However, first, basic operations of the interrogator 10 that are performed when a negative judgment is obtained, will be described.

First, in the interrogator 10, the oscillator 41 oscillates a carrier wave FC1 having a frequency of e.g., 900 MHz, 2.4 GHz, or 5 GHz. The carrier wave FC1 produced by the oscillator 41 is subjected, by the modulator 42 under control of the controller 31, to ASK modulation using not only information indicating an ID number of the interrogator 10 and hopping timing and/or pattern but also an ID data of a designated transponder. The thus modulated carrier wave FC1 is transmitted from the antenna 47 via the circulator 44.

When the transponder 20 receives the carrier wave FC1 transmitted from the interrogator 10, the subcarrier-wave modulator 52 of the transponder 20 phase-modulates, using an information signal representing an ID number of the transponder 20, as shown in FIG. 6A, the subcarrier wave sent from the subcarrier-wave oscillator 53, and thereby produces a phase-modulated subcarrier wave, as shown in FIG. 6B, that in turn is applied to the modulator demodulator 60.

Subsequently, in the transponder 20, the modulator demodulator 60 amplitude-modulates or phase-modulates, using the subcarrier-wave signal fs1, the carrier wave FC1 and emits the modulated carrier wave as the reflected wave f1 (see FIG. 1) via the antenna 61. The electric wave transmitted from the antenna 61 is received by, e.g., the interrogator 10, as shown in FIG. 1.

When each of the other transponders 21, 22, 23, 24, 25 receives the carrier wave FC1 transmitted from the interrogator 10, the each transponder operates in the same manner as described above with respect to the transponder 20. More specifically described, an information signal, as shown in FIG. 6C, is used by the subcarrier-wave modulator 52 to phase-modulate the subcarrier wave sent from the subcarrier-wave oscillator 53, and thereby produces a phase-modulated subcarrier wave, as shown in FIG. 6D, that in turn is applied to the modulator demodulator 60.

The subcarrier waves fs1, fs2 have respective frequencies as shown in FIG. 6E in which the axis of abscissa indicates frequency f and the origin "O" of the axis indicates a baseband frequency f=0. In the transponder 20, the modulator demodulator 60 amplitude-modulates or phase-modulates the carrier wave FC1, using the subcarrier signal fs1, and the thus modulated carrier wave is returned as a reflected wave from the antenna 61. The electric wave transmitted from the antenna 61 has a spectrum as shown in FIG. 6F (only a half portion of the spectrum is shown). In FIG. 6F, FC1 represents the carrier wave transmitted from the interrogator 10; FC2 represents a carrier wave from the interrogator 11; FC1+fs1 represents the reflected wave f1 returned from the transponder 20; and FC1+fs2 represents the reflected wave f2 from the transponder 21.

Subsequently, when the interrogator 10 receives the signal transmitted from the transponder 20, the received signal is sent via the circulator 44 to the LNA 45, subsequently is amplified by the LNA 45, and then is mixed, by the carrier-wave demodulator 46, with the signal sent from the oscillator 41 so as to subject the received signal to homodyne detection In addition, an amplitude or magnitude of the received signal amplified by the LNA 45 is detected by the amplitude detector 48, and the detected magnitude is inputted to the controller 31, so that the inputted magnitude can be used for the communications using the common carrier wave or the exclusive carrier wave that will be described later by reference to FIGS. 8 and 9. A signal-reception frequency band of the interrogator 10 is so pre-selected as to cover a sideband of the highest hopping frequency, but not to cover a frequency of any other carrier wave. If the signal-reception frequency band covers a frequency of a different carrier wave, the magnitude of the reflected wave that has been modulated by each transponder is relatively lowered and accordingly an S/N ratio or a signal to interference ratio of the reflected wave is lowered, because the magnitude of the carrier wave is much greater than that of the reflected wave.

The homodyne detection results in demodulating a signal, shown in FIG. 6G, that is a mixture of the subcarrier-wave signal fs1 carried by the reflected wave transmitted from the transponder 20 and the subcarrier-wave signal fs2 carried by the reflected wave transmitted from the transponder 21. This mixture signal is converted into digital values by the A/D converter (not shown) incorporated by the band separating filter 32, and the subcarrier-wave signal carried by the reflected wave f1 from the transponder 20 and the subcarrier-wave signal carried by the reflected wave f2 from the transponder 21 are subjected, by the band separating filter 32, to a filtering treatment using Fourier transformation, so as to be separated into respective channels (CH1, CH2, CH3, . . . ) corresponding to the hopping frequencies. Thus, the subcarrier-wave signal carried by the reflected wave f1 from the transponder 20 is obtained as a subcarrier-wave signal that is modulated as shown in FIG. 6H; and the subcarrier-wave signal carried by the reflected wave f2 from the transponder 21 is obtained as a subcarrier-wave signal that is modulated as shown in FIG. 6I. In fact, however, a series of digital values corresponding to each of the waves shown in FIGS. 6H and 6I is obtained.

If the frequency of a subcarrier wave is hopped to different frequencies, a subcarrier-wave signal is outputted through each of different channels corresponding to the different hopping frequencies. When the subcarrier-wave demodulator 33 demodulates each of the subcarrier-wave signals outputted through the different channels, the original information signal can be obtained. More specifically described, regarding the reflected wave f1 returned from the transponder 20, an information signal, shown in FIG. 6J, is obtained from the wave shown in FIG. 6H; and regarding the reflected wave f2 returned from the transponder 21, an information signal, shown in FIG. 6K, obtained from the wave shown in FIG. 6I.

Since the different channels output the respective information signals corresponding to the subcarrier-wave signals having the different hopping frequencies, the frame separator 34 separates the respective outputs of the different channels into appropriate frames, and the frame sorter 35 sorts the thus obtained frames into respective series of frames corresponding to the respective transponders. Finally, the frame connector 36 connects, for each of the transponders, the corresponding frames to each other in time sequence so as to reproduce the corresponding original information signal and input the thus reproduced original information signal into the controller 31.

Next, the outputs from the channels will be explained by reference to FIG. 7. FIG. 7 is an illustrative view showing the outputs from the channels, such that numerals indicated in rectangular frames represent respective numbers given to the six transponders and alphabets following the numerals represent time sequence. Here, "Transponder 1" corresponds to the transponder 20 shown in FIG. 1; and "Transponders 2, 3, 4, 5, and 6" correspond to the transponders 21, 22, 23, 24, 25 shown in FIG. 2, respectively. Therefore, for example, data from "Transponder 1" continues as follows: "1a"→"1b"→"1c"→"1d"→"1e"→"1f"→"1g". . . .

Regarding the example shown in FIG. 7, Channel 1 outputs signals from Transponders 5, 6; Channel 2 outputs signals from Transponders 4, 5; Channel 3 outputs signals from Transponders 1, 6; Channel 4 outputs signals from Transponders 5, 2; Channel 5 outputs signals from Transponders 6, 3; Channel 6 outputs signals from Transponders 2, 3, 1, 4; Channel 7 outputs signals from Transponders 3, 2; Channel 8 outputs signals from Transponders 5, 1; Channel 9 outputs signals from Transponders 2, 4, 3, 1; Channel 10 outputs signals from Transponders 1, 6; Channel 11 outputs signals from Transponders 6, 2, 4; Channel 12 outputs signals from Transponders 4, 3; Channel 13 outputs signals from Transponders 1, 2, 4; Channel 14 outputs signals from Transponders 3, 5; Channel 15 outputs signals from Transponders 4, 5, 6; and Channel 16 outputs signals from Transponders 3, 1.

The above-indicated outputs are separated by the frame separator 35 into frames corresponding to each of the transponders, and the frames are connected to each other in time sequence by the frame connector 36 so as to be reconstructed. For example, the output from Transponder 1 is obtained as "frame 1a" from Channel 3, "frame 1b" from Channel 13, "frame 1c" from Channel 10, "frame 1d" from Channel 6, "frame 1e" from Channel 8, "frame 1f", from Channel 9, and "frame 1g" from Channel 16, and those frames are connected to each other in time sequence so as to be reconstructed in the order of "1a", "1b", "1c", "1d", "1e", "1f", "1g".

In the above-described method, the interrogator simultaneously receives the frequency-hopped subcarrier waves carried by the reflected waves returned from the transponders, and accordingly the controller 31 can identify a channel in which frequencies of two or more subcarrier waves interfere with each other. Therefore, the interrogator can inform the transponders of the channel in which the frequencies of the subcarrier waves interfere with each other.

In a conventional method, two transmitting and receiving devices (i.e., two transceivers) are synchronized with each other for frequency hopping, and accordingly one of the two transmitting and receiving devices demodulated only a signal transmitted from the other device, in time sequence, and neglects, as noise signals, the signals transmitted from other devices than the two devices. In contrast, in the present communication system 1, the interrogator simultaneously receives the hopped frequencies in the entire range, and accordingly the signals returned from all the transponders are all outputted from the channels. Therefore, the signals from the plurality of transponders can be simultaneously detected by reconstructing those output signals in time sequence for each ID code. Each transponder sends its ID code in relation with each frequency hopping, and sends a frame-end marker before the each frequency hopping. In the case where a frequency hopping pattern is known to the interrogator, the interrogator can reconstruct the frames according to the hopping pattern.

Next, the operation of the communication system 1 will be described in detail by reference to the flow charts shown in FIGS. 8 and 9.

First, the operation of the controller 81 of the interrogator 10 will be described by reference to the flow chart shown in FIG. 8. As shown in FIG. 8, when the interrogator 10 operates to make communications using a common carrier wave (Step S1: YES), the controller 31 turns off the transmission switch 42a of the modulator 42 (Step S2), the amplitude detector 48 detects an amplitude or magnitude of a detection signal (Step S3), and the controller judges, based on the detected magnitude of the detection signal, whether there are any other interrogators that are transmitting the common carrier wave (Step S4). If the common carrier wave is being transmitted (Step S4: YES), the controller receives reflected signals (Step S5). If the controller receives an ID signal from a target transponder (Step S6: YES) and current communications end (Step S7: YES), then the controller 31 terminates the communications. On the other hand, if the common carrier wave is not being transmitted (Step S4: NO), the controller 31 turns on the transmission switch 42a of the modulator 42 (Step S8), and transmits the common carrier wave so as to make communications using the common carrier wave (Step S9). Then, if the current communications end (Step S7: YES), the controller 31 terminates the communications.

If the controller 31 does not receive the signal from the target transponder (Step S6: NO), the control goes back to Step S1. When the controller 31 operates to know that the target transponder is operating normally (i.e., the target transponder has no information or data to be transmitted and accordingly does not transmit any information and the interrogator cannot receive any information), when the controller 31 operates to make communications with a specific transponder, or when the target transponder transmits a communication requesting signal using the common carrier wave, the controller 31 does not operate to make communications using the common carrier wave (Step S1: NO). Then, the controller 31 changes the main frequency of the carrier wave from that of the common carrier wave to that of an exclusive carrier wave (Step S10), turns on the transmission switch 42a of the modulator 42 (Step S11), and makes communications using the exclusive carrier wave (Step S12). After the communications end, the controller 31 turns off the transmission switch 42a of the modulator 42 (Step S13), and then goes back to Step S1. Since the interrogator 10 carries out the homodyne detection, the common and exclusive carrier waves that are transmitted by the interrogator 10 to the transponders 20 through 25 are all modulated and reflected. However, because of the subcarrier-wave-frequency hopping, the probability that frequencies of respective subcarrier waves from two or more transponders interfere with each other is very small, i.e., the interferences of the subcarrier waves are largely reduced. The output power of the common carrier wave is smaller than that of the exclusive carrier wave. Therefore, even if each transponder simultaneously receives the common carrier wave and the exclusive carrier wave, the transponder can reliably identify the call or interrogation of the interrogator carried by the exclusive carrier wave.

At Step S9, the controller 31 cooperates with the analogue circuit portion 40 to function as an identification information transmitter which periodically (i.e., at a pre-set first period) transmits, when the interrogator 10 transmits the common carrier wave, at least one of (a) first identification information that identifies, in distinction from the other interrogators 11, 12, the interrogator 10 that is transmitting the common carrier wave and (b) second identification information that identifies the common carrier wave in distinction from each of the exclusive carrier waves transmitted by the interrogators 10–12, such that the first identification information and/or the second identification information accompany the common carrier wave. More specifically described, if the pre-set first period has passed since the switch 42a is turned on at Step S8, the identification information transmitter transmits, with the common carrier wave, the first and/or second identification information, and subsequently it periodically repeats the transmission of the first and/or second identification information.

Also, at Step S9, the controller 31 functions as a carrier-wave-transmission stopping portion which periodically (i.e., at a pre-set second period longer than the first period) stops the interrogator 10 from transmitting the common carrier wave. More specifically described, if the pre-set second period has passed since the switch 42a is turned on at Step S8, the control of the controller 31 goes to Step S7. In many cases, a negative judgment and a positive judgment are made at Steps S7 and S1, respectively. Thus, the control goes to Step S2 to turn off the switch 42a to stop the transmission of the common carrier wave. Subsequently, the carrier-wave-transmission stopping portion periodically stops the interrogator 10 from transmitting the common carrier wave.

Next, the operation of each of the transponders 20 through 25 will be described by reference to the flow chart shown in FIG. 9. As shown in FIG. 9, when the transponder wakes (starts) from its sleeping state (Step S21), the transponder judges whether it is receiving a carrier wave (Step S22). If the transponder is not receiving any carrier waves (Step S22: NO), it sleeps (Step S27); and if it is receiving a carrier wave (Step S22: YES), the transponder judges whether the carrier wave is the common carrier wave (Step S23). If the carrier wave is continuous, i.e., is not modulated based on information, that is, if the carrier wave is the common carrier wave (Step S23: YES), the transponder transmits information or data (Step S24). If the information transmission has not ended yet (Step S25: NO), the control goes back to Step S22. If the information transmission has ended (Step S25: YES), the transponder sleeps (Step S27).

If the transponder is receiving a carrier wave (Step S22: YES) and if the carrier wave is not continuous, i.e., is modulated based on information (Step S23: NO), the transponder demodulates the carrier wave and judges whether the information is directed to me, i.e., the transponder itself. If the transponder judges that the information is not directed to me (Step S26: NO), it sleeps (Step S27). On the other hand, if the transponder judges that the information is directed to me (Step S26: YES), the control goes back to S23. When the transponder judges that the carrier wave is not modulated and is continuous, the transponder transmits information or data. When the transponder once starts sleeping (Step S27), it keeps the sleeping state (Step S27) till a pre-set time passes (Step S28: NO). When the pre-set time passes (Step S28: YES), the transponder wakes (starts) from the sleeping state (Step S21). Thus, when the modulation ends and the carrier wave changes to be continuous, the transponder transmits information or data. Thus, if the carrier wave is continuous, the transponder can judge that the carrier wave is the common carrier wave; and if the carrier wave includes a portion that is modulated based on information such as an ID code of the interrogator or an ID code of a target transponder to be called or interrogated, the transponder can judge that the carrier wave is the exclusive carrier wave. However, the interrogator may be modified such that when it transmits the common carrier wave, it modulates, when appropriate, a portion of the carrier wave such that the modulated portion indicates that the remaining portion of the carrier wave is the common carrier wave.

As is apparent from the foregoing description, the communication system 1 includes the plurality of interrogators 10, 11, 12 that are considerably near to each other and, before each one of the interrogators transmits the common carrier wave, the each interrogator attempts to detect the common carrier wave and the signals returned from the transponders. If the each interrogator detects the common carrier wave transmitted by another interrogator, and the carrier wave signal modulated and reflected by the target transponder, then the each interrogator just continues detecting the signal. Thus, the interrogators prevent themselves from transmitting the respective common carrier waves in a disorderly manner, and causing interferences of the signals. In addition, since the total number f transmission of the carrier waves that need the greater amount of consumption of electric power is reduced, the interrogators can save the electric power.

Each of the interrogators 10, 11, 12 usually uses the frequency of the common carrier wave, but when the each interrogator calls a specific transponder, it changes that frequency to the frequency of its exclusive carrier wave. Thus, the each interrogator can make communications with the specific transponder, without disturbing the communications using the common carrier wave. Since the power of the exclusive carrier wave is greater than that of the common carrier wave, commands sent from the each interrogator to the specific transponder are less likely disturbed by the common carrier waves so that those commands can be reliably received by the specific transponder. If the specific transponder hops the frequency of the subcarrier wave, the probability that its communications may interfere with those of other transponders still lowers. Thus, the specific transponder can make the more reliable communications, although each transponder modulates and reflects all the carrier waves, irrespective of whether they are the common carrier wave or the exclusive carrier waves.

The communication system 1 may employ a plurality of interrogators including a primary interrogator that mainly transmits a common carrier wave, and one or more secondary interrogators that mainly transmit respective exclusive carrier waves. In this case, each of the secondary interrogator transmits, to the primary interrogator, a transmission requesting signal that requests the primary interrogator to transmit the common carrier wave, and the primary interrogator receives the requesting signal and transmits the common carrier wave toward each of a plurality of transponders. Each secondary interrogator is adapted to receive, immediately after transmitting the request signal, the reflected waves from the transponders. The primary interrogator may transmit, together with the common carrier wave, an identification signal that identifies the primary interrogator in distinction from the secondary interrogators, or identifies the common carrier wave in distinction from the exclusive carrier waves. In fact, in many cases, the identification signal or a subcarrier wave modulated based on an information signal including the identification signal, is used to modulate the common carrier wave and transmit the thus modulated carrier wave.

In the illustrated embodiment, the interrogator 10 judges, before transmitting a carrier wave, whether it is detecting a carrier wave transmitted by a different interrogator, based on an amplitude or magnitude of the received signal amplified by the LAN 45, the magnitude being detected by the amplitude detector 48. However, the amplitude detector 48 may be omitted. In the latter case, the output of the carrier-wave demodulator 46 may be inputted to an LPF (i.e., a low pass filter) so as to remove a high-frequency component of the output and detect a magnitude of a direct-current (DC) component, or a low-frequency component, of the output, the low frequency being sufficiently lower than the frequencies of the subcarrier waves. If the detected magnitude is greater than a pre-set value and continues for a pre-set period, the interrogator can judge that the different interrogator is transmitting the common carrier wave.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. An interrogator for use in a communication system including, in addition to the interrogator as a first interrogator, a second interrogator, a first transponder, and a second transponder, the first interrogator comprising: a carrier wave transmitter which transmits a first carrier wave toward the first transponder, so that the first transponder receives the first carrier wave, modulates the first carrier wave based on first information, and returns the modulated first carrier wave as a first reflected wave, toward the first interrogator; a reflected wave receiver which receives the first reflected wave returned from the first transponder; a demodulator which demodulates the first reflected wave received by the reflected wave receiver, into a demodulated signal; an information obtaining device which obtains said first information from the demodulated signal; a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave toward the second interrogator; a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on said first information and returned therefrom; and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave.

2. The interrogator according to claim 1, wherein when the second carrier wave transmission judging device judges that the second interrogator is transmitting the second carrier wave, and when the reflected wave reception judging device judges that the reflected wave receiver cannot receive the third reflected wave returned from the first transponder, the transmitter and receiver controller controls the carrier wave transmitter to transmit, toward the first transponder, a third carrier wave having a frequency different from a frequency of the second carrier wave.

3. The interrogator according to claim 1, wherein the first and second interrogators can transmit, as a common carrier wave, the first and second carrier waves that have a same frequency, the first interrogator can transmit, as a first exclusive carrier wave, a third carrier wave having a frequency different from the frequency of the common carrier wave, and the second interrogator can transmit, as a second exclusive carrier wave, a fourth carrier wave that has a frequency different from the respective frequencies of the common carrier wave and the first exclusive carrier wave, and wherein the second carrier wave transmission judging device judges whether the second interrogator is transmitting the second carrier wave as the common carrier wave, and does not judge whether the second interrogator is transmitting the fourth carrier wave as the second exclusive carrier wave.

4. The interrogator according to claim 3, wherein a power of each of the first and second carrier waves as the common carrier wave is smaller than a power of each of the third and fourth carrier waves as the first and second exclusive carrier waves.

5. The interrogator according to claim 3, further comprising an identification information transmitter which periodically transmits, when the carrier wave transmitter transmits the first carrier wave as the common carrier wave, at least one of (a) first identification information that identifies, in distinction from the second interrogator, the first interrogator that is transmitting the common carrier wave and (b) second identification information that identifies the common carrier wave in distinction from each of the first and second exclusive carrier waves, such that said at least one of (a) the first identification information and (b) the second identification information accompanies the common carrier wave.

6. The interrogator according to claim 1, wherein the transmitter and receiver controller comprises a first-carrier-wave-transmission stopping portion which periodically stops the carrier wave transmitter from transmitting the first carrier wave.

7. A transponder for use in a communication system including, in addition to the transponder as a first transponder, a second transponder, the first interrogator according to claim 3, and a second interrogator, the first transponder comprising:
a carrier wave receiving and returning device which receives each of the common carrier receiver and the first exclusive carrier wave transmitted from the first interrogator;
a subcarrier wave modulator which generates a subcarrier wave and modulates the subcarrier wave based on an information signal representing identification information that identifies the first transponder in distinction from the second transponder;
a carrier wave modulator which modulates the common carrier wave received by the carrier wave receiving and returning device, based on the subcarrier wave modulated by the subcarrier wave modulator, so that the carrier wave receiving and returning device returns the modulated carrier wave as the first reflected wave;
a common carrier wave reception judging device which judges whether the carrier wave receiving and returning device is receiving the common carrier wave; and
a modulation controller which controls, when the common carrier wave reception judging device judges that the carrier wave receiving and returning device is receiving the common carrier wave, the carrier wave modulator to modulate the received common carrier wave, so that the carrier wave receiving and returning device returns the modulated carrier wave as the first reflected wave.

8. The transponder according to claim 7, further comprising an exclusive carrier wave reception judging device which judges whether the carrier wave receiving and returning device is receiving the first exclusive carrier wave transmitted from the first interrogator to the first transponder, the first exclusive carrier wave representing an interrogation directed from the first interrogator to the first transponder,
wherein the modulation controller comprises a modulation stopping portion which stops, when the exclusive carrier wave reception judging device judges that the carrier wave receiving and returning device is not receiving the first exclusive carrier wave, a modulating operation of the carrier wave modulator for a pre-set time.

9. The transponder according to claim 7, wherein the modulation controller comprises a communication requesting portion which, when the first transponder operates to communicate with the first interrogator using the first exclusive carrier wave and when the common carrier wave reception judging device judges that the carrier wave receiving and returning device is receiving the common carrier wave, adds, to the information signal used by the subcarrier wave modulator to modulate the subcarrier wave, a communication requesting signal that requests the first interrogator to transmit the first exclusive carrier wave to the first transponder so that the first interrogator and the first transponder communicate with each other using the first exclusive carrier wave.

10. The transponder according to claim 7, wherein the subcarrier wave modulator comprises a frequency hopping portion which hops a frequency of the subcarrier wave.

11. A communication system including a first interrogator, a second interrogator, a first transponder, and a second transponder, wherein the first and second interrogators comprise a primary interrogator which primarily transmits the common carrier wave toward each of the first and second transponders, and a secondary interrogator which sends, to the primary interrogator, a common-carrier-wave-transmission requesting signal that requests the primary interrogator to transmit the common carrier wave so that the primary interrogator transmits the common carrier wave toward said each of the first and second transponders, and which subsequently is ready for receiving a corresponding one of the first and second reflected waves returned from the first and second transponders, wherein the first interrogator is an interrogator according to claim 3, and wherein the first transponder comprises:
a carrier wave receiving and returning device which receives each of the common carrier receiver and the first exclusive carrier wave transmitted from the first interrogator;
a subcarrier wave modulator which generates a subcarrier wave and modulates the subcarrier wave based on an information signal representing identification information that identifies the first transponder in distinction from the second transponder;
a carrier wave modulator which modulates the common carrier wave received by the carrier wave receiving and returning device, based on the subcarrier wave modulated by the subcarrier wave modulator, so that the carrier wave receiving and returning device returns the modulated carrier wave as the first reflected wave;
a common carrier wave reception judging device which judges whether the carrier wave receiving and returning device is receiving the common carrier wave; and
a modulation controller which controls, when the common carrier wave reception judging device judges that the carrier wave receiving and returning device is receiving the common carrier wave, the carrier wave modulator to modulate the received common carrier wave, so that the carrier wave receiving and returning device returns the modulated carrier wave as the first reflected wave.

12. The communication system according to claim 11, wherein the primary interrogator transmits, together with the common carrier wave, an information signal comprising at least one of (a) a first identification signal that identifies the common carrier wave in distinction from each of the first and second exclusive carrier waves and (b) a second identification signal that identifies, in distinction from the secondary interrogator, the primary interrogator that is transmitting the common carrier wave.

13. The interrogator according to claim 1, wherein the carrier wave transmitter comprises a first antenna having a first range of directivity, and the reflected wave receiver comprises a second antenna having a second range of directivity, the first range of directivity being wider than the second range of directivity.

14. A communication system comprising:
a first interrogator and a second interrogator; and
a first transponder and a second transponder,
wherein the first interrogator comprises
a carrier wave transmitter which transmits a first carrier wave toward the first transponder so that the first transponder receives the first carrier wave, modulates the first carrier wave based on first information, and returns the modulated first carrier wave as a first reflected wave, to the first interrogator,
a reflected wave receiver which receives the first reflected wave returned from the first transponder, a demodulator which demodulates the first reflected wave received by the reflected wave receives into a demodulated signal, an information obtaining device which obtains said first information from the demodulated signal, a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave, to the second interrogator, a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on said first information and returned therefrom, and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave, wherein the first and second interrogators can transmit, as a common carrier wave, the first and second carrier waves that have a same frequency, the first interrogator can transmit, as a first exclusive carrier wave, a third carrier wave having a frequency different from the frequency of the common carrier wave, and the second interrogator can transmit, as a second exclusive carrier wave, a fourth carrier wave that has a frequency different from the respective frequencies of the common carrier wave and the first exclusive carrier wave, wherein the second carrier wave transmission judging device judges whether the second interrogator is transmitting the second carrier wave as the common carrier wave, and does not judge whether the second interrogator is transmitting the fourth carrier wave as the second exclusive carrier wave, and wherein the first transponder comprises a carrier wave receiving and returning device which receives each of the common carrier receiver and the first exclusive carrier wave transmitted in distinction from the first interrogator, a subcarrier wave modulator which generates a subcarrier wave and modulates the subcarrier wave based on an information signal representing identification information that identifies the first transponder in distinction from the second transponder, a carrier wave modulator which modulates the common carrier wave received by the carrier wave receiving and returning device, based on the subcarrier wave modulated by the subcarrier wave modulator, so that the carrier wave receiving and returning device returns the modulated carrier wave as the first reflected wave, a common carrier wave reception judging device which judges whether the carrier wave receiving and returning device is receiving the common carrier wave, and a modulation controller which controls, when the common carrier wave reception judging device judges that the carrier wave receiving and returning device is receiving the common carrier wave, the carrier wave modulator to modulate the received common carrier wave, so that the carrier wave receiving and returning device returns the modulated carrier wave as the first reflected wave.

15. A communication system comprising:

a first interrogator and a second interrogator;

and a first transponder and a second transponder, wherein the first interrogator comprises a carrier wave transmitter which transmits a first carrier wave toward the first transponder so that the first transponder receives the first carrier wave, modulates the first carrier wave based on first information, and returns the modulated first carrier wave as a first reflected wave, to the first interrogator, a reflected wave receiver which receives the first reflected wave returned from the first transponder, a demodulator which demodulates the first reflected wave received by the reflected wave receiver, into a demodulated signal, an information obtaining device which obtains said first information from the demodulated signal, a second carrier wave transmission judging device which judges, before the carrier wave transmitter transmits the first carrier wave, whether the second interrogator is transmitting a second carrier wave toward the second transponder so that the second transponder receives the second carrier wave, modulates the second carrier wave based on second information, and returns the modulated second carrier wave as a second reflected wave, to the second interrogator, a reflected wave reception judging device which judges, when the second carrier wave transmission judging device judges that the second interrogator is transmitting the second carrier wave, whether the reflected wave receiver can receive, as a third reflected wave, a modulated second carrier wave that has been modulated by the first transponder based on said firstinformation and returned therefrom, and a transmitter and receiver controller which controls, when the reflected wave reception judging device judges that the reflected wave receiver can receive the third reflected wave returned from the first transponder, the carrier wave transmitter not to transmit the first carrier wave, and additionally controls the reflected wave receiver to receive the third reflected wave.

16. The communication system according to claim 15, wherein the first and second interrogators can transmit, as a common carrier wave, the first and second carrier waves that have a same frequency, the first interrogator can transmit, as a first exclusive carrier wave, a third carrier wave having a frequency different from the frequency of the common carrier wave, and the second interrogator can transmit, as a second exclusive carrier wave, a fourth carrier wave that has a frequency different from the respective frequencies of the common carrier wave and the first exclusive carrier wave, and wherein the second carrier wave transmission judging device judges whether the second interrogator is transmitting the second carrier wave as the common carrier wave, and does not judge whether the second interrogator is transmitting the fourth carrier wave as the second exclusive carrier wave.

* * * * *